United States Patent [19]

Bederke et al.

[11] Patent Number: 4,909,915

[45] Date of Patent: * Mar. 20, 1990

[54] NON-AUTOCROSS-LINKING BINDER COMBINATION, AQUEOUS LACQUER COATING COMPOUNDS CONTAINING THE BINDER COMBINATION AND A METHOD FOR USING THE SAME

[75] Inventors: Klaus Bederke, Sprockhovel; Georg Hendrikx, Velbert; Hermann Kerber; Hans-Peter Patzschke, both of Wuppertal; Paul Rupieper, Velbert, all of Fed. Rep. of Germany

[73] Assignee: Herberts Gesellschaft mit beschrankter, Wuppertal, Fed. Rep. of Germany

[*] Notice: The portion of the term of this patent subsequent to Sep. 12, 2006 has been disclaimed.

[21] Appl. No.: 86,707

[22] Filed: Aug. 18, 1987

[30] Foreign Application Priority Data

Aug. 19, 1986 [DE] Fed. Rep. of Germany ....... 3628122

[51] Int. Cl.$^4$ ..................... C25D 13/00; C08G 63/52
[52] U.S. Cl. ................. 204/181.4; 204/181.7; 525/377; 528/303; 528/332; 427/12
[58] Field of Search ........ 528/302, 303, 332; 525/377; 204/181.4, 181.7; 427/12

[56] References Cited

U.S. PATENT DOCUMENTS

| | | |
|---|---|---|
| 3,548,420 | 7/1969 | Spoor et al. . |
| 3,639,339 | 2/1972 | Beaton et al. .................. 525/377 X |
| 3,962,161 | 6/1976 | Trapasso ........................ 525/377 X |
| 3,966,681 | 6/1976 | Maeda et al. ................... 528/302 X |
| 3,988,281 | 10/1976 | Minami et al. . |
| 4,251,421 | 2/1981 | Hertler ............................ 525/377 X |
| 4,252,703 | 2/1981 | Patzschke et al. . |
| 4,352,842 | 10/1982 | Kooymans et al. . |
| 4,397,990 | 8/1983 | Kooymans et al. . |
| 4,401,774 | 8/1983 | Kooymans et al. . |
| 4,405,763 | 9/1983 | Kooymans et al. . |
| 4,458,054 | 7/1984 | Schmozer et al. . |
| 4,477,530 | 10/1984 | Diefenbach et al. . |
| 4,536,566 | 8/1985 | Coffey ............................ 528/332 X |
| 4,557,976 | 12/1985 | Geist et al. . |
| 4,644,036 | 2/1988 | Walz et al. . |

FOREIGN PATENT DOCUMENTS 1297789 7/1970 Fed. Rep. of Germany .
1414436 11/1975 United Kingdom .

*Primary Examiner*—Stephen J. Kalafut
*Attorney, Agent, or Firm*—Michael O. Warnecke; Donald A. Peterson

[57] ABSTRACT

Non-autocross-linking binder compositions for water dilutable lacquers are described which comprise components (A), 94 to 40% by weight of a water-dilutable ionic poly(meth)acrylate resin containing hydroxyl groups, (B), 1 to 10% by weight of a special copolymer to facilitate grinding, and (C), 5 to 50% by weight of a cross-linking agent. Aqeuous coating compositions containing the non-autocross-linking binder compositions and methods for using the water dilutable lacquers containing this binder compositions for cathodically or anodically coating electrically conductive objects are also described.

13 Claims, No Drawings

4,909,915

NON-AUTOCROSS-LINKING BINDER COMBINATION, AQUEOUS LACQUER COATING COMPOUNDS CONTAINING THE BINDER COMBINATION AND A METHOD FOR USING THE SAME

BACKGROUND OF THE INVENTION

1. Field of the Invention

This invention relates to a non-autocross-linking binder composition for use in water dilutable lacquers which are capable of being deposited electrophoretically and to aqueous electro dip lacquer coating compounds (ATL or KTL baths) capable of being deposited at the anode or cathode. This invention also relates to methods using the lacquer coating compounds containing the non-auto-cross-linking binder composition in coating articles.

2. Description of the Related Art

Electrode dip lacquer coating compounds are used as primers on a large technical scale. They are also referred to as electrophoresis lacquers or EC lacquers. Maleate oils, butadiene oils containing carboxyl groups or epoxide resins containing amino groups are frequently used as EC lacquers. Thermal cross-linking of these binders is carried out by various processes, e.g. by the reaction of unsaturated double bonds or functional groups of the principal resin with formaldehyde condensation resins, blocked polyisocyanates or transesterifiable cross-linking agents. Such lacquers, while useful, often do not necessarily have all the desired properties for a particular customer's specific requirements.

For the formation of lacquers which are stable in color, of the kind required, for example, for the manufacture of domestic implements, these systems have the undesirable property of severe yellowing. When the lacquer is applied in two coats, bloom-like color changes may even occur in the top coat, which impair the surface appearance of the lacquer. Other binder systems known in the art based on poly(meth)acrylate resins which have less tendency to undergo yellowing have not hitherto shown the high protection against corrosion obtainable with amino epoxy resins in the motor car industry. Aqueous, non-yellowing electro dip lacquer coating compounds containing, as a principal resin, a synthetic resin binder containing primary and/or secondary hydroxyl groups and primary, secondary and/or tertiary amino groups, such as amino poly(meth)acrylate resins having a hydroxyl number of from 80 to 250 (mg KOH per g of solid resin), an amine number of from 30 to 150 (mg KOH per g of solid resin) and an average molecular weight (Mn) of from 250 to 10,000 are described in DE-A-No. 34 36 346 (EP No. 180051).

In DE-OS No. 23 57 152 there are described aqueous, non-yellowing electrode dip lacquer coating compounds containing, as a principal resin, poly(meth)acrylate resins containing primary and/or secondary hydroxyl groups and carboxyl groups and composed of
  20 to 60% by weight of hard monomers,
  20 to 40% by weight of soft monomers,
  4 to 20% by weight of monomers containing hydroxyl groups and
  4 to 20% by weight of $\alpha,\beta$-unsaturated carboxylic acids.
Both these resin systems have the disadvantage of having insufficient pigment absorption capacity and providing insufficient protection against corrosion, especially at the edges and corners of coated articles.

SUMMARY OF THE INVENTION

It is an object of the present invention to provide non-autocross-linking binder combinations for water dilutable, non-yellowing lacquers and in particular aqueous electro dip lacquer coating compounds capable of being deposited electrophoretically, which have a high pigment absorption capacity and result in coatings with improved gloss and improved covering of the edges when applied by electrophoretic deposition at the anode or cathode followed by rinsing with water and stoving. It has surprisingly been found that this problem may be solved by means of a binder composition comprising a water dilutable ionic poly(meth)acrylate resin (component (A)) with a special copolymer combination (component (B)) of a copolymer containing amino groups and a polyisocyanate.

The present invention thus broadly relates to the non-autocross-linking binder composition for water dilutable lacquers described herein, to the electrophoretically deposited aqueous coating compositions containing this binder composition, and to methods for coating articles using the water dilutable lacquers containing this binder composition.

The non-autocross-linking binder composition according to the invention contains components (A), (B) and (C) in the quantities set forth following:

(A) 94 to 40% by weight of water dilutable poly(meth)acrylate resin carrying ionic groups and containing hydroxyl groups, (B) 1 to 10% by weight of a copolymer obtainable by a reaction comprising components:
  (a) 80–95% by weight of a copolymer of
    (a1) 0.5 to 40% by weight of N,N-di-$C_{1-4}$-alkylamino-$C_{1-8}$-alkyl(meth)acrylamides or a mixture of N,N-di-$C_{1-4}$-alkylamino-$C_{1-8}$-alkyl(meth)acrylates and N-substituted (meth)acrylamides or (meth)acrylamide, or mixtures thereof, in which the ratio of amino(meth)acrylates to amido(meth)acrylates is in the range of from 1:2 to 2:1,
    (a2) 10 to 40% by weight of hydroxy-$C_{2-8}$-alkyl(meth)acrylates,
    (a3) 20 to 89.5% by weight of copolymerizable, $\alpha,\beta$- olefinically unsaturated compounds and
  (b) 5 to 20% by weight of a polyisocyanate containing unmasked isocyanate groups: and, (C) 5 to 50% by weight of cross-linking agent.

Component (A) is preferably used in a proportion of 84 to 57% by weight and component (C) is preferably used in a proportion of 15 to 35% by weight.

Component (A) used according to the invention is a poly(meth)acrylate resin containing hydroxyl groups and containing basic or acid groups which form ionic salts by at least partial neutralization. These may be either groups forming anions or groups forming cations. The expression "poly(meth)acrylate" is intended to encompass both polyacrylates and polymethacrylates.

The polymer resin of component (A) containing ionic groups is prepared by solution polymerization and has an amine member of 30 to 150, a hydroxyl number of, preferably, 30 to 450, most preferably 50 to 200 (mg KOH over g of solid resin). The number average molecular weight ($\overline{M}n$) is preferably from 500 to 50,000, most preferably from 1000 to 10,000 (determined by gel permeation chromatography calibrated with polystyrene fractions). Its viscosity is preferably from 0.1 to 10 Pa.s, more preferably from 0.5 to 5 Pa.s as 50% solution in monoglycol ethers (in particular butoxyethanol) at 25° C. Its glass transition temperature (calculated from the glass transition temperatures of the homopolymers) is in particular in the range of from −50° to +150° C., preferably from −20° to +50° C. Suitable average molecular weights and viscosities may also be obtained by adding resins which have a higher or lower molecular weight or viscosity.

The poly(meth)acrylate resins containing ionic groups may be prepared according to the state of the art as described, for example, in DE-A-15 46 854, DE-A-23 25 177 or DE-A-23 57 152. The ethylenically unsaturated monomers used may be virtually any free radical polymerizable monomers but with the usual restrictions for copolymerizations as prescribed by the Q- and e-scheme of Alfrey and Price and the copolymerization parameters (see Brandrup and Immergut, Polymer Handbuch, 2nd edition, John Wiley and Sons, New York 1975). If the polymer resin containing ionic groups of component (A) is a basic poly(meth)acrylate resin, then it contains amino groups and/or onium groups such as ammonium, sulphonium or phosphonium groups. Amino groups, which enable the resin to be diluted with water after neutralization with organic acids, are particularly preferred. A copolymer of this kind containing amino groups and hydroxyl groups is preferably obtained by polymerization in solution. It has an amine number of, in particular, from 30 to 150, preferably from 45 to 100 mg of KOH per g of solid resin.

Component (A) may be prepared from free radical polymerizable monomers containing amino groups and free radical polymerizable monomers containing hydroxyl groups with free radical polymerizable monomers not containing any reactive groups or they may be prepared from free radical polymerizable monomers containing both amino groups and hydroxyl groups together with free radical polymerizable monomers not containing reactive groups.

Preferably, from 6 to 40 parts by weight of the free radical polymerizable monomers containing amino groups (component (a)) and from 4 to 50 parts by weight of the free radical polymerizable monomers containing hydroxyl groups (component (b)) or 8 to 60 parts by weight of the free radical polymerizable monomers containing hydroxyl and amino groups (component (b)) are used per 10 to 90 parts by weight of the free radical polymerizable monomers which do not contain reactive groups (component (c)).

According to a preferred embodiment, from 0.1 to 7 parts by weight of the 10 to 90 parts by weight of the free radical polymerizable monomers which do not contain reactive groups (component (c) ) may be replaced by ethylenically polyunsaturated monomers.

The amino group-containing monomers used are monomers corresponding to the general formula $$R-CH=CR'-X-A-N(R'')_2$$

wherein
$R = R'$ or $X-C_nH_{2n+1}'$
$R' = H$ or $C_nH_{2n+1}'$
$R'' = R'$, $C_nH_{2n}OH$ and/or $C_nH_{2n}NR_2'X=COO$, $CONH$, $CH_2O$ or $O$, $A=C_nH_{2n}$ or $$C_nH_{2n}-CH-CH_2$$
$$\phantom{C_nH_{2n}-CH-}|$$
$$\phantom{C_nH_{2n}-CH-}OH$$

and
n=1 to 8, preferably 1 to 3.

Examples of unsaturated monomers containing N (nitrogen) groups include N-dialkyl- and N-monoalkyl-amino-alkyl(meth)acrylates such as, for example, N-diethyl-aminoethylmethacrylate or N-tert.-butylamino-ethylacrylate or the corresponding N-alkanol compounds, N-dialkyl or N-monoalkyl-aminoalkyl (meth)acrylamide such as, for example, N-dimethyl-aminoethanol-acrylamide or the corresponding N-alkanol compounds, and/or heterocyclic compounds containing vinyl groups and carrying one or more basic nitrogen atoms, such as N-vinylimidazole.

Free radical polymerizable monomers containing hydroxyl groups are understood to be monomers which in addition to containing a polymerizable ethylenically unsaturated group, contain at least one hydroxyl group on a $C_2$ to $C_{20}$ straight chain, branched or cyclic hydrocarbon structure. These monomers mainly consist of unsaturated esterification products of the general formula $$R-CH=CR'-X-B$$

wherein
R, R' and X have the meanings defined above and
B denotes a straight chain or branched $C_{1-6}$ aklyl group having 1 to 3 OH groups.

(Meth)acrylic acid hydroxyalkylesters are particularly suitable, e.g. 2-hydroxyethylacrylate, 2-hydroxypropylmethacrylate, butane-1,4-diol monoacrylate, 2,3-dihydroxypropylmethacrylate, pentaerythritol monometracrylate and polypropylene glycol monoacrylate, as are also fumaric acid dihydroxyalkylesters. N-hydroxyalkyl(meth)acrylamides or N-hydroxyalkyl fumaric acid monoamides or diamides may also be used, e.g. N-hydroxyethylacrylamide or N-(2-hyrdoxypropyl)methacrylamide. Special elastic properties may be obtained by using a reaction product of hydroxyalkyl(meth)acrylate with ε-caprolactone. Other compounds containing hydroxyl groups include allyl alcohol, monovinyl ethers of polyhydric alcohols, especially of diols such as the monovinyl ether of ethylene glycol or butanediol, and hydroxyl group-containing allyl ethers or esters such as 2,3-dihydroxypropyl-monoallylether, trimethylolpropane monoalkylether or 2,3-dihydroxypropanoic acid allyl ester. Hydroxyethyl-, hydroxypropyl- and/or butane-1,4-diol(meth)acrylate are particularly suitable.

The choice of free radical polymerizable monomers containing no further reactive groups is made according to the mechanical properties required of the film and the compatibility of the resin combination used. Acrylic acid alkyl esters, methacrylic acid alkyl esters and maleic acid and/or fumaric acid dialkylesters are used, the alkyl groups having 1 to 20 carbon atoms and being arranged in a straight or branched/allyl chain and/or as a cycloaliphatic and/or (alkyl) aromatic group. "Hard" monomers which have a high glass transition temperature as polymers include, for example, monomers of the vinyl aromatic type, such as styrene, α-substituted styrenes such as o-methylstyrene, o-, m- and p-alkylstyrenes such as vinyl toluene or p-tert.butylstyrene, halogenated vinyl benzenes such as o- or p-chlorostyrene, short chain methacrylic acid esters such as methyl methacrylate, ethyl methacrylate, propyl methacrylate, butyl methacrylate, cyclohexyl methacrylate, isobornylmethacrylate, dihydrodicyclopenta-dienylmethacrylate, (meth)acrylamide and/or (meth)acrylonitrile. "Soft" monomers include acrylic acid esters with a long alcohol chain, such as n-butylacrylate, isobutylacrylate, tert-butylacrylate, 2-ethyl-hexyl-acrylate and/or lauryl acrylate. Unsaturated ethers such as ethoxyethylmethacrylate or tetrahydrofurfurylacrylate may also be used. Monomers of the vinyl ester type, especially vinyl ester-α-branched monocarboxylic acids may also be incorporated by polymerisation, in particular versatic acid vinyl esters, if suitable reaction conditions and reaction comonomers are chosen. By "ethylenically polyunsaturated monomers" are meant compounds having at least two radically polymerizable double bonds as represented by the general formula

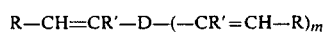

wherein m=1 to 3, preferably m=1 and in addition to the meanings already indicated above, D denotes the general chemical framework for the reactive double bond.

Examples of D include the o-, m- or p-phenyl group and groups of the formula —X—alkyl—X'—wherein alkyl preferably has 2 to 18 carbon atoms and X and X' may be identical or different linking groups, e.g. —O—, —CONH—, —COO—, —NHCOO—or —NH—CO—NH—. The symbol D may denote, for example, a benzene ring as in divinylbenzene, and may divinylbenzene. Further examples of suitable polyunsaturated monomers include reaction products of polyhydric alcohols, especially of dihydric alcohols, with α,β-unsaturated carboxylic acids, as already defined above. Examples include ethanol diol diacrylate, ethylene glycol dimethacrylate, 1,4-butane-dioldiacrylate, 1,6-hexanedioldiacrylate; neopentyl glycol dimethacrylate, triethylene glycol dimethacrylate, polyglycol-400-diacrylate, glycerol dimethacrylate, trimethylolpropane triacrylate and/or pentaerythritol diacrylate. Polyfunctional monomers containing urethane groups and amide groups are prepared by the reaction of, for example, hexanediisocyanate or methacrylic acid β-isocyanato-ethylester with hydroxyethyl(meth)acrylate or (meth)acrylic acid. Examples of compounds having a different structure include allylmethacrylate, diallylphthalate, butanediol vinyl ethers, divinyl ethyleneurea, divinylpropyleneurea, maleic acid diallylester, bismaleic imide, glyoxa-bisacrylamide and/or the reaction product of an epoxy resin with (meth)acrylic acid or fumaric acid semi-esters. It is preferred to use difunctional unsaturated monomers, such as butanediol diacrylate or hexanedioldiacrylate. When glycidylmethacrylate and methacrylic acid are used, the corresponding glycerol dimethacrylate is automatically formed in the course of polymerization. The nature and quantity of polyunsaturated monomers should be carefully adjusted to the reaction conditions (catalysts, reaction temperature, solvent) in order that the desired high viscosity may be obtained without gel formation.

Copolymerization is carried out in known manner by solution polymerization with the addition of radical initiators and optionally molecular weight regulators at temperatures of from 50° to 160° C. It is carried out in a liquid in which the monomers as well as the polymers are soluble. The monomer content and the polymer content after complete polymerization is about 50 to 90% by weight. Solution polymerization in organic solvents which can be diluted with water is preferred. Solvents of this kind are, for example, ethylene glycol, ethoxyethanol, butoxyethanol, diethyleneglycol, triethyleneglycol, diethyleneglycol dimethylether, propylene glycol, methoxypropanol, ethoxypropanol, dipropyleneglycol monomethylether, dipropyleneglycol dimethylether, diacetone alcohol, acetone, methoxypropanone, dioxane, tetrahydrofuran, N-methylpyrrolidone or mixtures thereof. A proportion of non-water-soluble, high boiling solvents such as hexylene glycol, phenoxyethanol, ethylhexanol, isodecanol or 2,2,4-trimethylpentane-1,3-diol-monoisobutyrate may also be added to improve levelling and lower the coating impedance. The solvent or solvent mixture is generally heated to the reaction temperature and the monomer mixture is then run in over a period of several hours. In order that the process may be carried out at the reflux temperature, the initiator is adjusted to the boiling point of the solvent mixture. It normally decomposes with a half life of from 30 minutes to 10 hours. The initiator is either dissolved cold in the monomer mixture or for safety reasons is added separately during the inflow of monomers. Peroxides and/or azo compounds are added as catalysts which are soluble in organic solvents. They are added in quantities of 0.1 to 5% by weight, preferably 0.5 to 3% by weight, based on the quantity of monomers. The peroxides used may be, for example, benzoyl peroxide or di-tert.-butyl peroxide, hydroperoxides such as tert.-butylhydroperoxide or cumene hydroperoxide or peresters such as tert.-butyl peroctoate or tert.-butylperbenzoate. 2,2'-Azo-bis-(2-cyanopropane) and 1,1'-azo-bis-cyclohexane carbonitrile are examples of azo compounds which are decomposed by heat. Radical forming compounds of the dibenzyl type such as 1,2-bis-(4-methylphenyl)-1.2-dicarbethoxy-1,2-dicyanoethane may also be used as initiators. The molecular weight may be reduced in known manner by means of molecular weight regulators. The regulators used for this purpose are preferably mercaptans, halogen-containing compounds or other radical transferring substances. Particularly preferred regulators are n- and tert.-dodecylmercaptan, tetrakismercaptoacetylpentaerythritol, tert.-butyl-o-thiocresol, thiosalicylic acid, buten-1-ol and dimeric α-methylstyrene.

The preparation of amino-(meth)acrylate resins may also be carried out by a polymer analogous reaction. For example, a copolymer containing acrylamide groups may be reacted with formaldehyde and a secondary amine and/or amino alcohol. A particularly preferred process is described in DE-A-3 436 346. In this process, monoethylenically unsaturated monomers containing epoxide groups are first incorporated in the copolymer by polymerization. The resin containing epoxide groups has an average molecular weight ($\overline{M}n$) of 600-10,000 and an epoxy equivalent weight of 300-4,000. The product is then reacted with excess ammonia, primary and/or secondary monomanes and/or monoamines alcohols and the excess amine is then distilled off. A similar reaction may be carried out, for example, in preferably equivalent quantities with ketimines of polyamines containing a secondary amino group and one or more primary amino groups, such as the monoketimine of methyl isobutyl ketone and methylaminopropylamine or the diketimine of methyl isobutyl ketone and diethylene-triamine. The following are free radical polymerizable monoethylenically unsaturated monomers containing epoxide groups: Mono- and/or diglycidyl compounds of α, β' unsaturated acids, acid amides, alcohols or amines, such as, for example, glycidyl esters of (meth) acrylic acid, of fumaric acid and/or of maleic acid, of fumaric acid monoalkylesters and/or of maleic acid monoalkylesters; glycidyl compounds of (meth)acrylic acid amide, fumaric acid diamide, maleic acid diamide or maleic imide and/or glycidyl ethers of unsaturated alcohols such as vinyl alcohol and/or allyl alcohol. Other suitable compounds are monoglycidyl esters of dicarboxylic acid monoesters with unsaturated alcohols, such as phthalic acid-allyl-glycidyl ester. Vinyl and allyl esters of epoxidized fatty acids may also be used, such as 2,3-epoxy-butyric acid allyl ester or epoxy-stearic acid allyl ester. Diolefines in which one double bond has been epoxidized and are also suitable, e.g. vinyl-ethylene oxide, 1-methyl-1-vinyl-ethylene oxide or 3,4-epoxy-1-vinyl-cyclohexane. Glycidyl acrylate and glycidyl methacrylate are preferred for copolymerirzation. The proportion of epoxide group-containing unsaturated monomers in the copolymer is generally from 8 to 50% by weight. The lower limit is preferably 12% by weight and the upper limit 35% by weight. Polymeriation must run to completion before the reaction with amine takes place because otherwise reversible side reactions with the secondary amines take place on the activated double bonds of the monomers.

The secondary amines for the reaction with epoxide groups are advantageously secondary amines of formula

R—NH—R' wherein
R=—H or R',
R'=$C_nH_{2n+1}$, $C_nH_{2n}OH$ and/or $C_nH_{2n}$-N=C(alkyl)$_2$ and
n=1 to 8, preferably 1 or 2, and the alkyl group has 1 to 8 carbon atoms.

The following are examples of amines which may be used for the reaction: $C_1$ to $C_6$-dialkylamines having identical or different alkyl groups in the molecule, such as dimethyl, diethyl, diisopropyl, dibutyl, methyl-ethyl, methylpropyl or methylbutylamine, monocycloaliphatic amines such as morpholine, piperidine or pyrrolidine and/or monoalkanolamines such as N-methyl-aminoethanol and/or dialkanolamines such as diethanolamine or diisopropanolamine. Examples of primary amines and amino alcohols include $C_1$ to $C_8$ alkylamines such as ethylamine, 2-ethyl-hexylamine or aminoethanol. $C_1$ to $C_4$-alkyl groups are preferred in all cases, especially $C_1$ and/or $C_2$-alkyl groups. Secondary amines such as dimethylamine, diethylamine, methylethylamine or N-methyl-aminoethanol are preferred as they enable readily soluble ET baths with a high pH to be obtained after neutralization. The primary amines mentioned above are in most cases used as mixtures with secondary amines because the products obtained would otherwise be too highly viscous.

The number of primary and/or secondary hydroxyl groups is optimized so that stoving of the lacquer results in a highly cross-linked, solvent resistant film. Since the reaction with amine results in the formation of one secondary OH group from each epoxide group, at least one further hydroxyl group per molecule, preferably a primary hydroxyl group, should be incorporated by polymerization through other unsaturated monomers.

The number of epoxide groups determines the number of amino groups reacting with the epoxide groups and hence also the solubility of the product obtained. At least one epoxide group should be available per molecule. It is often advantageous to combine a high hydroxyl number with a low amine number and conversely. The aim to be achieved is generally a readily soluble product with a low degree of neutralization and high pH.

The non-autocross-linking amino poly(meth) acrylate resins described above which are free from epoxide groups are used as binders for cathodic deposition in ET baths (KTL baths).

In addition to the above-described hydroxyl group-containing poly(meth) acrylate resins containing amino groups there may also be used hydroxyl group-containing poly(meth)acrylate resins which contain acid groups as ionic groups. Examples of such resins containing acid groups include resins containing carboxyl groups, sulphonic acid groups and/or phosphoric acid groups. Carboxyl groups which enable the resin to be diluted in water after neutralization with bases, are particularly preferred. A poly(meth)acrylate resin of this kind containing carboxyl groups and hydroxyl groups is preferably obtained by free radical polymerization in solution. It preferably has an acid number of from 25 to 150, in particular from 40 to 80 (mg KOH per g of solid resin). Preferably, from 2 to 40 parts by weight of the free radical polymerizable monomers containing acid groups (component (a)), from 4 to 50 parts by weight of the free radical polymerizable monomers containing hydroxyl groups (component (b)) or from 10 to 90 parts by weight of the free radical polymerizable monomers not containing reactive groups (component (c)) are used. The monomers containing carboxylic acid groups used in this process are monomers corresponding to the general formula:

R—CH=CR'—COOH wherein
R=H, COOH, $C_nH_{2n+1}$ or $COOC_nH_{2n+1}$,
R'=H or $C_nH_{2n+1}$ and
n=1 to 6.

Examples of such monomers are acrylic acid, methacrylic acid, crotonic acid, fumaric acid, maleic acid monoalkyl esters and itaconic acid monoalkyl esters. Acrylic acid and methacrylic acid are preferred.

Other ionic groups are sulphonic acid groups and phosphoric acid groups. Examples of unsaturated monomers containing these groups are 2-amido-2-methylsulphonic acid, vinyl benzyl sulphonic acid, vinyl phosphoric acid and methacrylic acid hexapropylene glycol monophosphate.

Components (b) and (c) consist of the hydroxyl group-containing monomers already described above and monoethylenically unsaturated monomers which do not contain any other reactive groups. Similar polymers which may be used are known and have been described, for example, in Nos. DE-PS 10 53 696, DE-PS 12 97 789 and CH-PS 427 109.

The substance used as component (B) according to the invention is a copolymer obtainable by the reaction of (a) 80 to 95 % by weight of a copolymer of
(a1) 0.5 to 40% by weight of N,N-di-$C_{1-4}$-alkyl amino-$C_{1-8}$-alkyl(meth)acrylamides and/or a mixture of N,N-di-$C_{1-4}$-alkylamino-$C_{1-8}$ alkyl(meth)a-crylates and N-substituted (meth)acrylamides and/or (meth)acrylamide in which the ratio of amino(meth)acrylates to amido(meth)acrylates should be in the range of from 1:2 to 2:1, (a2) 10 to 40% by weight of hydroxy-$C_{2-8}$ alkyl(meth)-acrylates.

(a3) 20 to 89.5% by weight of copolymerizable $\alpha,\beta$-olefinically unsaturated compounds and (b) 5 to 20% by weight of a polyisocyanate containing unmasked and optionally also masked isocyanate groups and containing biuret, urethane or isocyanurate groups.

Component (a) is a copolymer of the monomers mentioned above. Compounds of component (a1) may contain both a tertiary amino group and a N-substituted amide group in the molecule. e.g. N,N-dimethylamino-propylmethacrylamide. For the preparation of the copolymer according to the invention, such compounds may be used alone or in combination with (meth)acrylates containing tertiary amino groups and/or N-substituted (meth)acrylamides and/or (meth)acrylamide but mixtures of (meth)acrylates containing tertiary amino groups and N-substituted (meth)acrylamides or (meth)acrylamide may also be used.

The ratio of compounds containing tertiary amino groups to compounds containing N-substituted or unsubstituted amide groups in combination is preferably in the range of from 1:1.1 to 1.1:1.

The following are preferred compounds used as monomer component (a):

N,N-Diethylaminopropylmethacrylamide, the corresponding di-n-butyl compound, N,N-dimethylamino-neopentylmethacryl-amide and the corresponding aminomethyl and aminooctyl compounds are examples of N,N-di-$C_1$ $_{to}$ $_4$-alkylamino- $C_1$ $_{to}$ $_8$-alkyl(meth)acrylamides. N,N-Dimethylaminopropyl-1 methacrylamide is particularly preferred.

A mixture of N,N-di-$C_1$ $_{to}$ $_8$-alkylamino-$C_1$ $_{to}$ $_8$-alkyl(meth)acrylates and N-$C_1$ $_{to}$ $_{12}$-alkyl(meth)acrylamides or N-$C_1$ $_{to}$ $_{12}$-cycloalkyl(meth)acrylamides or N-$C_1$ $_{to}$ $_{12}$-aralkyl(meth)acrylamides and/or (meth)acrylamide may be used instead of or in addition to N,N-di-$C_1$ $_{to}$ $_4$-amino-$C_1$ $_{to}$ $_8$-alkyl(meth)acrylamides.

The following are examples of N,N-di-$C_1$ $_{to}$ $_4$alkyl-amino-$C_1$ $_{to}$ $_8$-alkyl(meth)acrylates:

N,N-Dimethylaminoethylacrylate, N,N-dimethylaminoethyl methacrylate, N,N-diethylaminoethyla-crylate and N,N-dimethyl-aminoneopentylacrylate. The alkyl part of the alkyl groups attached to the nitrogen atom preferably has 1 or 2 carbon atoms. The alkylene group between the nitrogen atom and the ester group suitably contains 2 to 8 carbon atoms.

The following are examples of N-substituted-(meth)-acrylamides:

N-Methyl-, N-ethyl-, N-n-propyl-, N-isopropyl- and N-n-butyl-acrylamide, N-methyl-methacrylamide, N-(1,1-dimethyl-3-oxobutyl)-acrylamide, N-tert.-butyl-methacryl-amide, N-decyl-acrylamide, N-cyclohexyl-methacrylamide, N-benzyl-methacrylamide and N-alkoxymethyl-(meth)acrylamides such as e.g. N-n-butoxymethyl-acrylamide and N-n-butoxy-methyl-methacrylamide.

The N-substituents for the (meth)acrylamides may be any aliphatic, cycloaliphatic or aromatic groups of the kind present in (meth)acrylamide used in the art for the preparation of acrylate resins. These groups may also contain hetero atoms and in that sense keto groups, for example, may also be present as N-substituents.

The compounds used as component (a2) may be the usual hydroxyacrylates used in the field of acrylate resins. Preferred hydroxyacrylates are hydroxyethylacrylate, hydroxyethylmethacrylate, 2-hydroxypropylacrylate, 2-hydroxy-propylmethacrylate, 4-hydroxybutylacrylate and 4-hydroxy-butylmethacrylate.

The compounds used as component (a3) are copolymerizable $\alpha,\beta$-olefinically unsaturated compounds of the kind conventionally used for the preparation of acrylates. The following are examples: Aromatic vinyl compounds such as styrene, $\alpha$-methylstyrene, o-, m- and p-methylstyrene and p-tert.-butylstyrene, styrene itself being preferred; alkylesters of (meth)acrylic acid, such as methyl-, ethyl-, propyl-, n-butyl-, iso-butyl-, tert.-butyl-, hexyl-, octyl-, decyl-, dodecyl-, hexadecyl- and octadecyl-acrylate and -methacrylate, among which n-butyl-, isobutyl- and tert.-butyl-acrylate. 2-ethylhexyla-crylate and methyl- and n-butyl-methacrylate are preferred: vinyl esters such as vinyl acetate, vinyl propionate and vinylversatate; and alkyl esters of unsaturated polycarboxylic acids, e.g. of maleic, fumaric, crotonic, itaconic or citraconic acid.

The ratios by weight of components (a1) to (a2) to (a3) is preferably 12 to 30:30 to 40:30 to 60.

The copolymer used in the process may be prepared by the usual methods of polymerization, e.g. solvent-free, solution or bead polymerization. The various polymerization processes are well known and have been described in Houben-Weyl, Methoden der Organischen Chemie, 4th Edition, Volume 14/1, pages 24–255 (1961) and have already been described above with reference to the preparation of component (A).

The solution polymerization process is preferred for the preparation of the copolymer according to the invention because the reaction of the hydroxyfunctional polymer with partially masked or unmasked polyisocyanates can be carried out more easily and the pigment dispersing agent is used in a dissolved form.

The polymerization conditions (reaction temperature, inflow time of the monomer mixture, solution concentration) are chosen so that the number average molecular weight (determined by gel permeation chromatography using polystyrene as the calibrating substance) lies in the range of from 3000 to 100,000.

The copolymers obtained have glass transition temperatures in the range of $-20°$ C. to $+75°$ C., calculated from the glass transition temperatures of the homopolymers of the individual monomers given in the literature (Fox equation).

One essential feature of the copolymers of the present invention is that the copolymers described above are reacted with polyisocyanates (b). The polyisocyanates used for this purpose according to the invention must contain at least partly unmasked isocyanate groups which react with the OH groups of component (a). The polyisocyanates may in addition contain masked isocyanate groups. Partially masked polyisocyanates are preferred.

The masking agents used are CH—, NH—or OH-acidic compounds such as malonic acid dialkylesters, acetoacetic acid alkyl esters, acetylacetone, $\epsilon$-caprolactam, hydroxybenzoic acid esters, tert.-butanol and oximes such as methyl ethyl ketoxime or dimethyl ketoxime Ethyl acetoacetate, methyl ethyl ketoxime and $\epsilon$-caprolactam are particularly preferred.

The ratio of polyisocyanate to masking agent is chosen so that on a purely arithmetical basis, at least one isocyanate group per molecule of polyisocyanate put into the process is freely available after the masking reaction for the reaction of the partially masked polyisocyanate with the copolymer containing OH groups (component (a)).

The ratios of the two resin components which are to be reacted, namely copolymer (a) and the partially masked or unmasked polyisocyanate (b), are preferably so arranged that the equivalent ratio of reactive hydroxyl groups of copolymer (a) to isocyanate groups of the partially masked or unmasked polyisocyanate (b) lies in the range of from 99:1 to 70:30, preferably from 95:5 to 85:15.

The polyisocyanates used according to the invention contain biuret, urethane or isocyanurate groups in their molecule, mainly because the polyisocyanates used as starting materials for the invention are trade products which contain such groups.

Since the polyisocyanates used for the reaction with component (a) advantageously contain only one free isocyanate group per molecule, the trade products may be reacted with such a quantity of masking agent that on average only one free isocyanate group is left per molecule of polyisocyanate. Examples of such polyisocyanates include a reaction product of hexamethylene diisocyanate and water containing biuret groups, for example the product obtained from 3 mols of hexamethylenediisocyanate and 1 mol of water, the said product having an isocyanate content of about 22% (corresponding to the trade product Desmodur N ® BAYER); a polyisocyanate containing isocyanurate groups prepared, for example, by the trimerization of hexamethylenediisocyanate and having an isocyanate content of about 21.5% (corresponding to the trade product Desmodur 3390 ® BAYER); and polyisocyanates containing urethane groups, for example the reaction products of 3 mols of diisocyanate and 1 mol of triol, e.g. tolylene diisocyanate and trimethylolpropane (NCO content about 17.5% corresponding to the trade product Desmodur L ® BAYER).

In addition to the aminopoly(meth)acrylate resins (component (A)) and the copolymer, also referred to as paste binder (component (B)), the binder combination according to the invention may contain cross-linking agents, hereinafter referred to as component (C), together with the usual additives as described in detail in the Patent Specifications already mentioned above with reference to the KTL baths and also mentioned in more detail below. Examples of component (C) used for combinations with acid poly(meth)acrylate resins include formaldehyde condensation resins (urea-, melamine-, benzoguanamine- and/or phenol-formaldehyde resins) and/or blocked polyisocyanates. Basic polymer resins are mixed with blocked polyisocyanates and/or with resins containing transesterifiable ester groups with the addition of the usual catalysts. Non-yellowing blocked aliphatic or cycloaliphatic polyisocyanates or non-yellowing resins containing transesterifiable ester groups or mixtures thereof are preferred in order to make use of the advantageous properties of the amino-poly(meth)acrylate resin and obtain ET baths with as high a pH as possible. From 50 to 5% by weight of cross-linking agent are used for 50 to 95% by weight of components (A) and (B) as is usual in the state of the art and the products known in the art may be used as cross-linking agents (see the literature references given above). Up to 30% by weight of hydroxyfunctional resins capable of reacting with the cross-linking agents may in addition be incorporated with the KTL baths by emulsification (see e.g. EP-A-0 040 090).

The ratio in which components (A) and (B) are mixed with (C) is preferably in the range of from 90:10 to 60:40 and is determined empirically from the optimum obtainable properties for technical application at the given stoving temperature. It may in some cases be advantageous to use a combination of several cross-linking systems. The cross-linking agent has an average molecular weight ($\overline{Mn}$) of about 250 to 5000, especially from 500 to 3000.

Amine-formaldehyde condensation resins are obtained by the reaction of aldehydes with urea, N-alkylurea, dicyandiamide, various triazines such as melamine, benzoguanamine or acetoguanamine or mixtures thereof. The aldehydes may be monofunctional or polyfunctional. Examples include formaldehyde and its polymerization products, such as paraformaldehyde, polyoxymethylene or trioxane, and aliphatic and cyclic aldehydes such as glyoxal, acetaldehyde, acrolein. propionaldehyde, butyraldehyde or furfural. The resins obtained vary in their molecular weights and reactivity according to the reaction conditions employed and the degree of methylolation. Condensation with formaldehyde, furfural, paraformaldehyde, polyoxymethylene or trioxane is generally carried out with the addition of weak acids or bases as catalysts. Strong acids are used for the condensation with acrolein, glyoxal, acetaldehyde, propionaldehyde or butyraldehyde. The primary reaction product is first neutralized, aldehyde is then added and the reaction is continued with the addition of weak acids or bases. The preferred aldehyde is formaldehyde. The alcohol groups, preferably methylol groups, of the aldehyde condensation products are partially or, preferably, completely etherified with alcohols. Amine-formaldehyde resins in which the major proportion of methylol groups have been reacted with monohydric alcohols or mixtures thereof are preferred. Particularly preferred are methanol, ethanol, propanol, butanol, heptanol, benzyl alcohol and other aromatic alcohols, cyclic alcohols such as cyclohexanol and monoethers of ethylene glycols such as ethoxyethanol or butoxyethanol. If alcohols containing more than four carbon atoms are to be incorporated, the methylol group is first etherified with a lower alcohol and the higher alcohol is then introduced by transether-ification. The preferred alcohols are lower aliphatic monohydric alcohols such as methanol and/or butanol. Melamine resins which have been reacted with 3 to 6 mols of formaldehyde and subsequently completely etherified with methanol are particularly preferred. The resins are produced in accordance with the state of the art and offered as sales products by many firms. Etherification with hydroxycarboxylic acids such as hydroxybenzoic acid, salicylic acid or dimethylolpropionic acid gives rise to melamine resins containing carboxyl groups and unsaturated melamine resins are obtained from hydroxyalkyl(meth)acrylates or allyl alcohol.

The preferred phenol resins are reaction products of phenol or substituted phenols with various aldehydes used in molar excess in the presence of alkaline catalysts (resol type). Examples of such phenolic compounds include phenol, cresol, xylenol, resorcinol and substituted phenols such as p-tert.-butylphenol, p-tert.-amylphenol, p-phenylphenol, isothymol, cardanol and multinuclear phenols such as dihydroxy-diphenylpropane (bisphenol A) or dihydroxy-diphenylmethane. Phenolic novolak resins may also be used as starting materials. These are optionally defunctionalized with monocarboxylic acids, preferably with α-branched monocarboxylic acids, monophenols, especially those substituted with $C_2$ to $C_{18}$ alkyl groups, or mono-epoxides such as α-monoepoxide alkanes, monoglyceride ethers or monoglyceride esters. The aldehydes used may be formaldehyde or polymerisation products thereof such as paraformaldehyde, trioxymethylene, polyformaldehyde or hexamethylene tetramine. Acetaldehyde, paraldehyde and metaldehyde are very suitable, as are also butyraldehyde and furfural. The methylol groups are partially or, preferably, completely etherified with methanol, ethanol, propanol and/or butanol. Resins which are reacted with an excess of formaldehyde per phenolic OH group, i.e. with about 1.1 to 2.5 mol of formaldehyde, in an alkaline medium, are preferred. Resins based on bisphenol A which have been reacted with about 4 formaldehyde molecules and have been completely etherified with butanol are particularly preferred. Phenol resins with various molecular weights may be used, including both those which are insoluble in water and those which contain carboxyl groups. Suitable phenol carboxylic acids include, for example, 4,4-bis-(4-hydroxyphenyl)-pentanoic acid, glycollic acid derivatives of bisphenols such as 2-(4-hydroxyphenyl)-2-(carbethoxyphenyl)-propane and salicylic acid. Very low molecular weights saturated or unsaturated methylol phenol ethers such as methylone resins may also be used.

Blocked polyisocyanates are prepared by completely reacting a multifunctional isocyanate with at least a stoichiometric quantity of a monofunctional compound containing active hydrogen (Zerewitinoff reaction), optionally with the addition of basic catalysts such as tertiary amines or small quantities of tin salts such as dibutyl tin dilaurate. The isocyanate group is thereby protected against reactions with water or alcohols at room temperature. The reaction product obtained reacts with the hydroxyl groups of the ionic poly(meth)acrylate resin when heated so that the protective group is split off. This group splits off at stoving temperatures below 210° C. preferably below 190° C., particularly below 180° C. but above 110° C., preferably above 140° C. and most preferably above 150° C. so that the isocyanate group released can react with the basic resin. The agents which block the isocyanates contain only one single amine, amide, lactam, thiol or hydroxyl group. Thus, for example, aliphatic and cycloaliphatic alcohols such as 2-ethylhexanol, dialkyl-amino alcohols such as dimethylaminoethanol, oximes such as methyl ethyl ketoxime, lactams such as ε-caprolactam or pyrrolidone-2, imides such as phthalimide or N-hydroxymaleic imide, hydroxyalkyl esters and esters of malonic acid and of acetoacetic acid have been found suitable for this purpose but β-hydroxy-glycols and -glycol ethers and glycol amides are also recommended.

Aliphatic cycloaliphatic and/or aromatic polyisocyanates containing at least two isocyanate groups per molecule are suitable as typical multifunctional isocyanates. Suitable aromatic diisocyanates include the isomers and isomeric mixtures of phenylene diisocyanate, tolylene diisocyanate, xylylene diisocyanate, biphenylene diisocyanate, naphthylene diisocyanate and diphenylmethane diisocyanate, diphenyltetraisocyanate and naphthyl tetraisocyanate. (Cyclo)aliphatic diisocyanates give rise to compounds with little tendency to yellowing owing to their good resistance to ultraviolet light. Examples of such diisocyanates include isophorone diisocyanate, cyclopentylene diisocyanate and the hydrogenation products of aromatic diisocyanates such as cyclohexylene diisocyanate, methyl cyclohexylene diisocyanate and dicyclohexyl-methane diisocyanate. Aliphatic diisocyanates are compounds represented by the formula

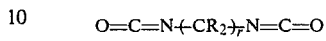

wherein r denotes an integer from 2 to 20, in particular from 6 to 8 and the groups denoted by R, which may be identical or different, may be hydrogen or a lower alkyl group with 1 to 8 carbon atoms, preferably 1 or 2 carbon atoms. Examples include trimethylene diisocyanate, tetramethylene diisocyanate, pentamethylene diisocyanate, hexamethylene diisocyanate, propylene diisocyanate, ethyl ethylene diisocyanate, dimethylethylene diisocyanate, methyl trimethylene diisocyanate and trimethylhexane diisocyanate. Isophorone diisocyanate and dicyclohexylmethane diisocyanate are particularly preferred diisocyanates.

Vinyl polymers which contain isocyanate groups and have been obtained by the copolymerization of, for example, cyanatoethyl(meth)acrylate or dimethyl- isopropylbenzyl-isocyanate with alkyl(meth)acrylates and/or (alkyl)vinyl benzenes may also be used.

Mixed aliphatic/aromatic isocyanate compounds are also suitable.

Products formed by the trimerization or oligomerization of diisocyanates or by the reaction of diisocyanates with polyfunctional compounds containing OH groups or NH groups have been found to be suitable triisocyanates. These include, for example, the trade products already described with reference to component (B). The average functionality may be lowered, if necessary, by the addition of monoisocyanates. Examples of such chain breaking monoisocyanates include phenylisocyanate, cyclohexyl isocyanate and stearylisocyanate.

An increase in the molecular size may also be obtained by a reaction with polyalcohols containing tertiary amino groups, such as N-methyl-diethanolamine or triethanolamine or polyamines containing tertiary amino groups, such as 3-(methyl)-3-(2-aminoethyl)aminopropylamine. Chain breaking N-dialkyl-amino alcohols such as dimethyl-aminoethanol and N,N-dialkylalkylenediamines such as dimethylaminopropylamine or N,N-diethyl-N'-methyl-1,3-ethanediamine may also be used to improve the solubility. Isocyanate-containing prepolymers based on polyglycol ethers, polyester polyols, polyether polyols, polycaprolactone polyols and/or polycaprolactam polyols may also be used to advantage. Aliphatic and cycloaliphatic polyisocyanates are preferred as they enable non-yellowing one-coat lacquers to be produced.

Another suitable type of cross-linking agent (Component (C)) is a resin containing terminal or lateral esterified carboxyl groups which are substantially stable in a neutral aqueous medium but react with one or more amino poly(meth)acrylates containing hydroxyl groups (component (A)) in the basic medium of the deposited film at temperatures higher than about 140° C. In this reaction, the transesterifiable ester groups undergo esterification with the hydroxyl groups of the aminopoly(meth)acrylate resin and the readily volatile "alcoholic protective groups" are split off. Substantially all the terminal or lateral carboxyl groups should be esterified with alcohols. In order to prevent migration of the polyester to the anode, care must be taken to ensure that the polyester has an acid number below 20, preferably below 10, most preferably below 3.

The reactivity of the esters is increased by a suitable chemical structure, e.g. by increasing the electrophilic activity of the carboxyl group or by a negative inductive effect on the alcohol group. Primary, secondary and tertiary carboxyl groups are capable of transesterification. Primary carboxyl groups are preferred on account of their higher reactivity. Transesterification is assisted by the volatility of low straight chained or branched primary monohydric alcohols or by 1,2-glycols optionally substituted by ether or ester groups. The lower the molecular weight of the alcohols which are split off in the transesterification reaction, the lower are the losses due to this splitting reaction. Numerous cross-linking agents containing ester groups used for transesterification with OH groups and/or transamidation with NH$_2$ groups are described in the literature. EP-A-0 04090, for example, describes polyurethane esters containing, as transesterifiable groups, hydroxyalkylester groups such as lactic acid ester or aminoalkylester groups.

The cross-linking agent used may also be a carboxylic group-containing polyester in which the carboxyl groups are blocked by substituted or unsubstituted 1,2-glycols to form ß-hydroxy compounds:

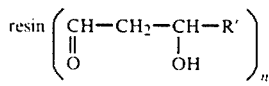

The 1,2-glycols used are advantageously substituted by saturated or unsaturated alkyl, ether, ester or amide groups, i.e. R' stands for H, R, CH$_2$OH,

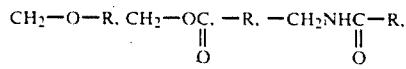

and n has a value of at least 2, preferably 3 to 10. R denotes a straight chain or branched alkyl group having 1 to 15 carbon atoms.

Cross-linking agents of this type are described in EP-A-No. 012 463 and DE-A-No. 31 03 642, e.g. as reaction products of trimellitic acid anhydride with Cardura E ® or the glycidyl ester of Versatic acid ®.

Other cross-linking agents may be prepared by the transesterification of dicarboxylic acid alkyl esters with polyhydric alcohols, e.g. a reaction product of trimethylolpropane and malonic acid dimethylester as described in EP-A-082 291.

Other cross-linking agents capable of transesterification may be obtained, as descried in No. DE-A33 315 469, by the Michael addition of alkyl acetoacetatesor malonic acid dialkylesters to resins containing double bonds which are activated by CO groups. This Michael addition may be carried out stoichiometrically or with excess quantities of double bonds.

Cross-linking agents containing carbalkoxymethyl ester groups are described in DE-A-33 22 766.

The cross-linking of poly(meth)acrylate resins containing OH groups with blocked polyisocyanates may be accelerated by the addition of from 0.01 to 2% by weight, especially from 0.5 to 1% by weight, based on the solid resin of components (A) and (B), of strongly basic tertiary amines and/or active metal compounds. A special, in some cases synergistic effect is obtained by the combination of the basic medium of the deposited aminopoly(meth)acrylate resin with the metal salts of bismuth, lead, cobalt, iron, antimony and/or tin-II or -IV. Catalysts such as iron -III acetylacetonate, dibutyltin dilaurate, tri-n-butyl tin oxide, dibutyl tin dioctyl maleate, tin octoate, tin oleate, tetrabutyl titanate and/or cobalt-2-ethylhexanoate are particularly preferred.

A relatively high catalyst content is generally required for catalyzing the transesterification process. From 0.1 to 10% by weight, preferably from 2 to 6% by weight of metal oxides, metal salts or metal comlexes of monovalent or higher valent metals, based on the quantity of components (A) and (B), are suitably used. They are generally dissolved in aliphatic or aromatic hydrocarbons after salt formation with 2-ethyl-hexanoic acid or naphtenic acid. These solutions are emulsified in the electrophoresis bath. Another possibility lies in complex formation of the metals with acetyl acetonate, dicyclopentadiene, 8-oxy-hydroquinoline, 4-methyl-catechol and/or 2,5-dimercapto-1,3,4-thiadiazole. Examples of suitable catalysts include antimony trioxide, cobalt naphthenate, lead octoate, iron acetyl acetonate, the reaction product of zinc oxide and 8-hydroxyquinoline, thallium dicyclopentadiene and triethanolamine titanate. Lead octoate and zinc hydroxyquinolate are preferred. The metal catalysts may also be dispersed in a finely divided form as pigments such as lead silicate. Water-dilutable metal salts may also be used as transesterification catalysts if the metal of the compound or complex is deposited with the lacquer in a finely divided form. Catalysts which are not readily soluble in the ET bath and become uniformly distributed in the deposited film during stoving after electrophoretic deposition are preferred. Components (A) and (C) may be mixed together in the cold or precondensed at elevated temperatures. Under these conditions, components (A) and (C) react with each other to a certain extent but without the mixture losing its capacity for heat curing and the property of being rendered water-soluble by neutralization.

To obtain a balance of the various properties required for technical application, the poly(meth)acrylate resin which is to be deposited electrophoretically should contain, in addition to the cross-linking agents, up to 30% by weight, preferably from 5 to 20% by weight, of a hydroxyfunctional resin capable of reacting with the cross-linking agent.

Thus hydroxyfunctional resins with OH number 500, especially from 50 to 300 and having an average molecular weight ($\overline{M}n$) of from 300 to 10,000, especially from 500 to 5000, may be used to increase the throwing power. Examples of such resins include styrene/allyl alcohol copolymers, (meth)acrylic copolymers containing OH groups, caprolactone polyols, caprolactam polyols, urethane polyols, and polyesters and polyethers containing OH groups. Thus copolymers containing OH groups may be prepared by the copolymerization of unsaturated monomers containing hydroxyl groups with other ethylenically unsaturated monomers which are free from reactive functional groups, as described above. The polyether polyols are understood to be compounds corresponding to the following general formula

wherein R = H or a lower alkyl group optionally carrying 35 various substituents, n = 2 to 6 and m = 5 to 50. Examples include polyoxytetramethylene glycols. Polyester polyols may be obtained by the polycondensation of polycarboxylic acids or their anhydrides with organic polyhydric alcohols or by the reaction of an ε-lactone with polyhydric alcohols. The polycarboxylic acids are usually aliphatic, cycloaliphatic or aromatic dicarboxylic acids and the polyhydric alcohols are usually straight chained or branched aliphatic or cycloaliphatic polyols. Examples include branched chain polyesters of adipic acid, phthalic acid anhydride, trimethylolpropane or butylene-1,4-glycol or the reaction product of ε-caprolactone with trimethylol propane. Polyurethane polyols are obtained by the reaction of aliphatic or cycloaliphatic polyalcohols, polyether polyols and/or polyester polyols. The various hydroxyfunctional resins may also be used as mixtures or have a segmented structure. Examples include the reaction products of 2 mol of polyglycol ether with 1 mol of a hydroxyl-containing polyester or 2 mol of polyglycolether with 2 mol of dicarboxylic acid and 1 mol of a hydroxyl-containing polyurethane. The resins contain the quantity of polar groups, preferably primary OH groups, required to enable them to be readily emulsified in the neutralized, ionic poly(meth)acrylate resin (component (A)). A low acid number or amine number, in each case below 30, in particular below 20, may be incorporated to improve the compatibility and dilutability with water. The resins are preferably so constructed that the components do not undergo yellowing when stoved.

The molecular weight range is selected so that the resins will not be volatile and yet sufficiently fluid for improved film formation. If precondensation is carried out, this may take place in any sequence. Ammonia or amines are used for neutralizing acid poly(meth)acrylate resins while organic acids are used for basic poly(meth)acrylate resins. Examples of amines include triethylamine, diethylamine, triisobutylamine, dimethylaminoethanol, monoethanolamine, diisopropanolamine, triethanolamine, morpholine and N-methylmorpholine.

Examples of acids include formic acid, acetic acid, propionic acid, lactic acid, citric acid, malonic acid, acrylic acid, phosphoric acid and alkylphosphoric acid. Mononbasic low molecular weight organic carboxylic acids are preferred. It is necessary to add at least sufficient neutralizing agent to ensure that the resin combination will form a stable emulsion. An excess of neutralizing agent above the equivalent degree of neutralization is preferably avoided. The MEQ value (milleequivalents of neutralized agent per 100 g of solid resin) is generally in the range of from 20 to 80. The MEQ value is preferably as low as possible so that a high deposition equivalent may be obtained.

The coating compound may in addition contain the usual lacquer technical additives such as anti-pitting agents, leveling agents, antifoamants, etc. The additives should, of course, be so chosen that they do not undergo undesirable reactions with water at the ph of the ET bath, do not bring in any undesirable foreign ions and do not precipitate irreversibly when left to stand for some time, i.e. it should be possible to obtain a suitable dispersion of the coating compound by stirring, even if it has been left to stand for some time.

The coating compound may contain up to about 20% by weight of organic solvents for the purpose of lowering the viscosity, controlling the deposition voltage and improving the adherence and leveling. It is desired to keep the organic solvent content as low as possible, preferably below 15% by weight and most preferably below 10% by weight. Suitable solvents include alcohols, glycol ethers and keto alcohols, optionally with the addition of aliphatic and/or aromatic hydrocarbons of various chain lengths. When choosing solvents, it must be borne in mind that the cross-linking agents are not water-soluble and a certain proportion of water-insoluble solvents may facilitate the process of dispersion and stablize the dispersion.

As the solvent content increases, the throwing power decreases, the thickness of the deposited layer increases and excessive coating may occur. Water-insoluble solvents are more powerful in this respect than water-soluble solvents. Any aprotic solvents which may have been necessary for the preparation of the resins may be replaced by other solvents after preparation of the product by distillation.

The solids content of the coating compound according to the invention is advantageously from 5 to 50% by weight after dilution with water. If the lacquer is adjusted to a relatively high solids content of from 25 to 50% by weight, preferably from 30 to 45% by weight, water dilutable stoving lacquers are obtained which may be applied by immersion, spraying, roller application, etc. to the surface to be coated. If, on the other hand, the solids content is diluted to 5 to 30% by weight, particularly to 10 to 20% by weight, then the lacquer obtained is suitable for electrophoretic deposition. The bath is constantly stirred to maintain a uniform temperature at the electrode surface and prevent the deposition of insoluble constituents of the dispersion, such as pigments. The pH of the lacquer is generally from 4.0 to 8.5, preferably from 5.0 to 8.0. Electrophoretic deposition should not be carried out earlier than 24 hours after preparation of the bath. During this time, the bath is preferably stirred continuously to ensure uniform distribution. During deposition, the bath is advantageously maintained at temperatures of about 15° to 30° C. The solids content, deposition temperature and time and voltage are chosen to provide the desired thickness of layer after washing with water and/or an ultrafiltrate and stoving at temperatures of about 150° to 230° C. Thus, for example, the layer thickness increases with increasing coating time and deposition voltage. When an electric current is applied at a voltage of, suitably, 50 to 500 volts between a metallically conductive workpiece and a counter-electrode, the principal resin, (component (A)), coagulates on the article which is to be lacquered. In doing so, the resin carries with it the water-insoluble grinding resin, cross-linking agents, pigments, catalysts, etc., with the result that the ratio of pigment to synthetic resin binder in the deposited film may shift in favour of the pigment. At the same time, water and the neutralizing agent used for neutralization accumulate in the bath. Concentrated lacquers must therefore be used for refilling the bath in order to compensate for this shift by altering the proportions. This correction may also be achieved by means of suitable apparatus, e.g. as used in electro-dialysis or ultrafiltration.

The copolymer, which constitutes component (B), may be pigmented in the usual manner in a ball mill, three-roller mill or pearl mill at temperatures below 80° C., either alone or with the addition of component (A) according to the invention. The usual inorganic and/or organic pigments, fillers, corrosion protection inhibitors and lacquer auxiliaries may be used, provided they do not undergo any undesirable reactions in the aqueous medium, do not bring in any water-soluble foreign ions add do not precipitate in such a manner on aging that the coagulate can no longer be stirred up. The ratio of pigment to binder depends on the dispersibility and viscosity of the binder and is generally in the range of from 0.1:1 to 1.5:1. Pigments and therefore also ET baths containing these pigments are preferably of a type which give rise to the ultimate color of the coated article and hence of its final lacquer coat. The lacquers are particularly suitable for the electro dip lacquering of metals and after stoving, preferably for 15 to 45 minutes at 160° to 190° C., they give rise to smooth, glossy, non-yellowing films which have good resistance to aging, adherence, hardness and elasticity as well as resistance to corrosion.

Owing to the higher pigment absorption capacity of component (B), high gloss lacquers can be prepared with a higher pigment binder ratio than would be possible without this measure. It is thereby possible to improve the protection of the edges of the articles by means of these lacquers.

DESCRIPTION OF THE PREFERRED EMBODIMENTS

EXAMPLES

Example A

Amino-poly(meth)acrylate resin A, 725 g of butoxyethanol are heated to 110° C. under inert gas while a reflux condenser is switched on. A mixture of 192 g of hydroxyethylacrylate, 137 g of butane-diol monoacrylate, 228 g of glycidyl methacrylate, 364 g of 2-ethyl-hexylacrylate, 439 g of butyl methacrylate, 438 g of methyl methacrylate, 90 g of styrene and 44 g of azo-bis-isobutyronitrile is added in the course of 3 hours. The temperature is then kept at 110° C. for one hour, 6 g of azo-bis-isobutyronitrile are added and this procedure is repeated after one hour. After 3 hours at 110° C. the solids content is found to be 72.2% by weight, and after dilution to a solids content of 60% by weight with butoxyethanol, the viscosity is found to be 2.14 Pa.s at 25° C. After cooling to 50° C., a mixture of 129 g of diethylamine and 201 g of isopropanol is rapidly added (1.10 mol of amine to 1.00 mol of epoxide). After 30 minutes, the reaction mixture is heated to 65° C. and kept at that temperature for one hour and then, heated to 105 to 110° C. and kept at this higher temperature for 3 hours. After cooling of the reaction mixture to 80° C., isopropanol and excess amine are carefully distilled off under vacuum. Adjustment of the solids content with butoxyethanol to about 78% by weight.

Final values:

| Solids content | 78.7% by weight (30 min. 1-50° C.) |
|---|---|
| Amine number | 45 (mg KOH/g of solid resin) |
| Viscosity | 60% by weight in butoxyethanol at 25° C. |

The viscosity of the resin is stable in storage and after combination with cross-linking agents (see Examples 2 and 3) the resin gives rise to smooth surfaces with uniform distribution of the thickness of the layer.

Example B

Copolymer B (grinding resin),

1. Partially masked polyisocyanate 177 g of c-Caprolactam are dissolved in 240 g of diethyleneglycol dimethylether while heating to 60° C. in a 2-liter, three-necked flask with ground glass top equipped with stirrer, thermometer and reflux condenser. 583 g of hexanediisocyanate isocyanurate are then added and the reaction temperature is raised to 80° C. The reaction mixture is kept at 80° C. until the masking reaction is concluded.

| Final values: | |
|---|---|
| Solids content | 69.8% by weight (1. hour, 150° C.) |
| Viscosity | 660 mPa.s (at 25° C.) |
| NCO number | 3.3% |

2. Acrylic polymer:

336 g of diethyleneglycol dimethylether are introduced into a 4-liter three-necked flask with ground glass top equipped with stirrer, thermometer, reflux condenser and two dropping funnels, and the substance is heated to 100° C. while stirring. A mixture of 200 g of dimethylaminopropyl methacrylamide.
98 g of 2-ethyl-hexylacrylate,
380 g of 2-hydroxypropylmethacrylate,
160 g of isobutylmethacrylate,
78 g of methyl methacrylate and
169. g of styrene and a solution of 24 g of azo-bis-isobutyronitrile in 406 g of diethyleneglycol dimethylether are both added continuously over a period of 5 hours from two dropping funnels while the temperature is kept constant at 100° C. At the end of the inflow period, a solution of 4 g of azo-bis-isobutyronitrile in 160 g of diethyleneglycol dimethylether is added. The reaction mixture is then polymerized to completion at 100° C. for 3 hours. The product is diluted with 403 g of diethyleneglycol dimethylether and cooled to 60° C. Urethanization is then carried out by the addition of 82 g of the partially masked polyisocyanate prepared as described above. After 2 hours at 60° C., the paste resin is virtually free from NCO groups.

| Final values | |
|---|---|
| Solids content | 44.2% by weight (1 hour at 150° C.) |
| Viscosity | 420 mPa.s (at 25° C.) |

Example C

Cross-Linking Agent(C) (blocked polyisocyanate).

666 g of isophorone diisocyanate and 134 g of trimethylolpropane are mixed with 431 g of ethyl glycol acetate and the mixture is heated to 60° C. over a period of one hour with stirring and exclusion of atmospheric moisture. The initially insoluble and solid trimethylolpropane melts when thus heated and it slowly reacts in the course of a further hour during which the temperature is raised to 90° C. The reaction mixture is kept at 90° C. for a further 3 hours to complete the reaction and an isocyanate equivalent weight of 410 is obtained. 366 g of ε-caprolactam are then added so slowly over a period of 3 hours that the reaction temperature does not exceed 100° C. The temperature is then kept at this level until the isocyanate number has fallen below 0.1%. The solvent is substantially distilled off under vacuum and the residue is diluted to a concentration of 80% by weight with butoxyethanol.

EXAMPLE 1

210.5 g of amino-poly(meth)acrylate resin A, (See Ex. A), 97.5 g of a rutile pigment, 2.6 g of a commercial extender based on silicates, 14.0 g of epoxypropanol and 22.5 g of copolymer (B) (See Ex. B) are ground for 15 minutes in a pearl mill. 73.1 g of cross-linking agent C (See Ex. C) are then added and the cmmponents are mixed in a dissolver with the addition of 8.5 g of formic acid (50%). The mixture is then diluted to 2.0 liters with completely salt-free water. Solids content: 14.4% by weight (obtained after 25 minutes at 180° C.)

Milliequivalents of neutralizing agent per 100 g of solids content: 33

Specific bath conductivity: 1420 microsiemens.

The substance is coated on a zinc phosphatized steel sheet (Bonder 132 of Metallgesellschaft) at a bath temperature of 30° C. and at 190 volts for 2 minutes. A dry film thickness of 30 μm is obtained after rinsing with water and 25 minutes stoving at 180° C.

Comparison Example, A-1:

Method of preparation as in Example 1 but with the following quantities:

220.9 g of amino-poly(meth)acrylate resin (A), 97.4 g of rutile pigment, 2.6 g of extender, 14.0 g of ethoxypropanol, 76.7 g of cross-linking agent C and 8.5 g of formic acid.

Comparison Example, B-1:

Method of preparation as in Example 1 but with the following quantities:

255.7 g of aminopoly(meth)acrylate resin (A), 67.4 g of rutile pigment, 1.8 g of extender, 10.5 g of ethoxypropanol, 88.7 g of cross-linking agent C and 8.5 g of formic acid.

The results are set out in Table 1 following.

112.5 g of 2-hydroxy-ethylacrylate,
82.5 g of acrylic acid,
22.5 g of di-tert.-butylperoxide and
15.0 g of tert.-dodecylmercaptan is run in over a period of 90 minutes while a temperature of 135° C. is maintained. The mixture is then left to polymerize for 3 hours and a solids content of 69% by weight is obtained. About 100 g of solvent are then distilled off under vacuum and a solids content of 75% by weight is obtained.

Characteristic data:

Solids content: 75% by weight (30 min,180° C.)

Viscosity: 650 mPa.s at 25° C. (after dilution to 50% by weight with butoxyethanol)

Acid number: 80.4 (mg KOH per g of solid).

EXAMPLE 2

112 g of poly(meth)acrylate A containing carboxyl groups according to Example A-2, 53.0 g of a commercial rutile pigment based on silicates, 4.5 g of a commercial levelling agent, 21.75 g of an epoxy resin ester prepared by the esterifi-cation of one equivalent of a liquid epoxy resin of the bisphenol A type having an equivalent weight of 188 and 1 mol of iso-nonanoic acid, 13.5 g of a commercial extender, 2 g of butoxyethanol and 3 g of copolymer (B), (See Ex. B) are triturated in a pearl mill for 15 minutes.

30.5 g of a commercial melamine resin, HMMM type mixed etherified (solids content 93% by weight) are added and mixed in a dissolver with the addition of 37 g of diisopropanolamine (diluted 1:1 with water). The reaction mixture is then diluted to 2 liters with completely desalted water with stirring.

Solids content: 10.2% by weight (obtained after 25 minutes at 180° C.)

Millequivalents of neutralizing agent per 100 g of solids content: 86

Specific bath conductivity: 840 microsiemens.

Comparison Example C-1

Method of preparation as in Example 2 but with the omission of copolymer (B) (Ex. B) and an increase in the dispersion time by 10 minutes.

Comparison Example D-1

TABLE 1

|  | Example 1 (with grinding resin) | Comparison Example A - 1 (without grinding resin) | Comparison Example B - 1 (without grinding resin) |
|---|---|---|---|
| Pigment/binder ratio | 0.5/1 | 0.5/1 | 0.3/1 |
| Edge Protection | good | good | moderate |
| Dispersion time required | 15 min. | 30 min. | 30 min. |
| Gloss measured at an angle of 60° | 75% | 59% | 75% |

Example A-2

Poly(meth)acrylate containing carboxyl groups 350 g of butoxyethanol are introduced into a 2-liter three-necked flask with ground glass top equipped with thermometer, reflux condenser and metered inflow device for monomer, and the butoxyethanol is heated to 135° C. A mixture of 200 g of methylmethacrylate.
255 g of butyl acrylate.
100 g of styrene, Method of preparation as for Comparison Example C but with the following quantities:

128.5 g of acrylate resin,
4.5 g of leveling agent,
2.0 g of butyl glycol,
25.0 g of epoly resin ester,
36.8 g of rutile pigment,
9.4 g of extender,
35.1 g of melamine resin and
37.0 g of diisopropanolamine.

The results are set forth in Table 2 following.

TABLE 2

|  | Example 2 (with grinding resin) | Comparison Example C - 1 (without grinding resin) | Comparison Example D - 1 (without grinding resin) |
| --- | --- | --- | --- |
| Pigment/Binder ratio | 0.5/1 | 0.5/1 | 0.3/1 |
| Edfe protection | good | good | moderate |
| Dispersion time required | 15 min. | 25 min. | 25 min. |
| Gloss measured at an angle of 60° | 71% | 59% | 70% |

We claim:

1. A non-autocross-linking binder composition for water dilutable lacquers, comprising:
   (A) 94 to 40% by weight of water dilutable poly(-meth)acrylate resin carrying ionic groups and containing hydroxyl groups,
   (B) 1 to 10% by weight of a copolymer obtainable by a reaction comprising:
      (a) 80–95% by weight of a copolymer of
         (a1) 0.5 to 40% by weight of N,N-di-$C_{1-4}$-alkylamino-$C_{1-8}$-alkyl(meth)acrylamides or a mixture of N,N-di-$C_{1-4}$-alkylamino-$C_{1-8}$-alkyl(meth)acrylates and N-substituted (meth)acrylamides or (meth)acrylamide, or mixtures thereof, in which the ratio of amino(meth)acrylates to amido(meth)acrylates is in the range of from 1:2 to 2:1,
         (a2) 10 to 40% by weight of hydroxy-$C_{2-8}$-alkyl(meth)acrylates,
         (a3) 20 to 89.5% by weight of copolymerizable, $\alpha,\beta$- olefinically unsaturated compounds and
      (b) 5 to 20% by weight of a polyisocyanate containing unmasked isocyanate groups; and
   (C) 5 to 50% by weight of cross-linking agent.

2. A non-autocross-linking binder composition according to claim 1, wherein said component (A) comprises a basic polymerization resin having an amine number of 30 to 150, a hydroxyl number of 30 to 450, a number average molecular weight ($\overline{M}n$) of 500 to 50,000, a viscosity of 0.1 to 10 Pa.s as 50% solution in monoglycol ethers at 25° C. and a glass transition temperature of −50° to +150° C.

3. A non-autocross-linking binder composition according to claim 1, wherein said component
   (A) comprises free radical polymerizable
      (a) monomers containing amino groups and
      (b) monomers containing hydroxyl groups or
      (ab) monomers containing amino groups and hydroxyl groups and, in each case,
      (c) monomers not containing reactive groups, from 6 to 40 parts by weight of component (a) and 4 to 50 parts by weight of component (b) or 8 to 60 parts by weight of component (ab) being used per 10 to 90 parts by weight of component (c).

4. A non-autocross-linking binder composition according to claim 3, wherein 0.1 to 7 parts by weight of said 10 to 90 parts by weight of monomers not containing any reactive groups, (component (c)), are replaced by an ethylenically polyunsaturated monomer.

5. A non-autocross-linking binder composition according to claim 1, wherein said component (A) comprises an acidic poly(meth)acrylate resin having an acid number of 25 to 150, a hydroxyl number from 30 to 450, a number average molecular weight ($\overline{M}n$) of 500 to 50,000, a viscosity of 0.1 to 10 Pa.s as a 50% solution in monoglycol ethers at 25° C. and a glass transition temperature of −50° to +150° C.

6. A non-autocross-linking binder composition according to claim 5, wherein said component (A) comprises:
   (a) 2 to 40 parts by weight free radical polymerizable monomers containing acid groups, and
   (b) 4–50 parts by weight free radical polymerizable monomers containing hydroxyl groups and
   (c) 10–90 parts by weight free radical polymerizable monomers not containing reactive groups.

7. The non-autocross-linking binder composition according to claim 1 wherein component (A) is a non-autocross-linking amino poly(meth)acrylate resin which is free from epoxide groups and has an amine number of 30 to 150 and a hydroxyl number of 30 to 450, obtainable by a reaction comprising a poly(meth)acrylate resin which contains epoxide groups and has an average molecular weight ($\overline{M}n$) of 600 to 10,000 and an epoxy equivalent weight of 300 to 4000 with an excess of ammonia, and at least one of primary monoamines and secondary monoamines and amino alcohols, wherein essentially all free epoxide groups undergo reaction, and wherein unreacted, excess amine compounds are essentially removed.

8. A non-autocross-linking binder composition according to claim 1, wherein said polyisocyanate containing unmasked isocyanate groups, (component b), also includes masked isocynate groups and at least one of biuret, urethhane and isocyanurate groups.

9. A non-autocross-linking binder composition according to claim 1 wherein said component (C) comprises at least one of the group consisting of transesterifiable cross-linking agents, blocked polyisocyanates and formaldehyde condensation resins, and mixtures thereof.

10. An aqueous coating composition containing the non-autocross-linking binder composition of claim 1 and water.

11. An aqueous coating composition containing the binder composition of claim 1, water, and at least one of the group consisiting of conventional pigments, fillers, corrosion inhibitors, lacquer auxiliaries, catalysts and organic solvents.

12. A method for coating articles, comprising cathodically or anodically depositing an aqueous coating composition of the binder composition of claim 10 onto an electrically conductive surface.

13. A method for coating articles, comprising cathodically or anodically depositing the aqueous coating composition of claim 11 onto an electrically conductive surface.

* * * * *